(No Model.)
N. & A. DRUCBERT.
LUBRICATOR.
No. 494,738
Patented Apr. 4, 1893.
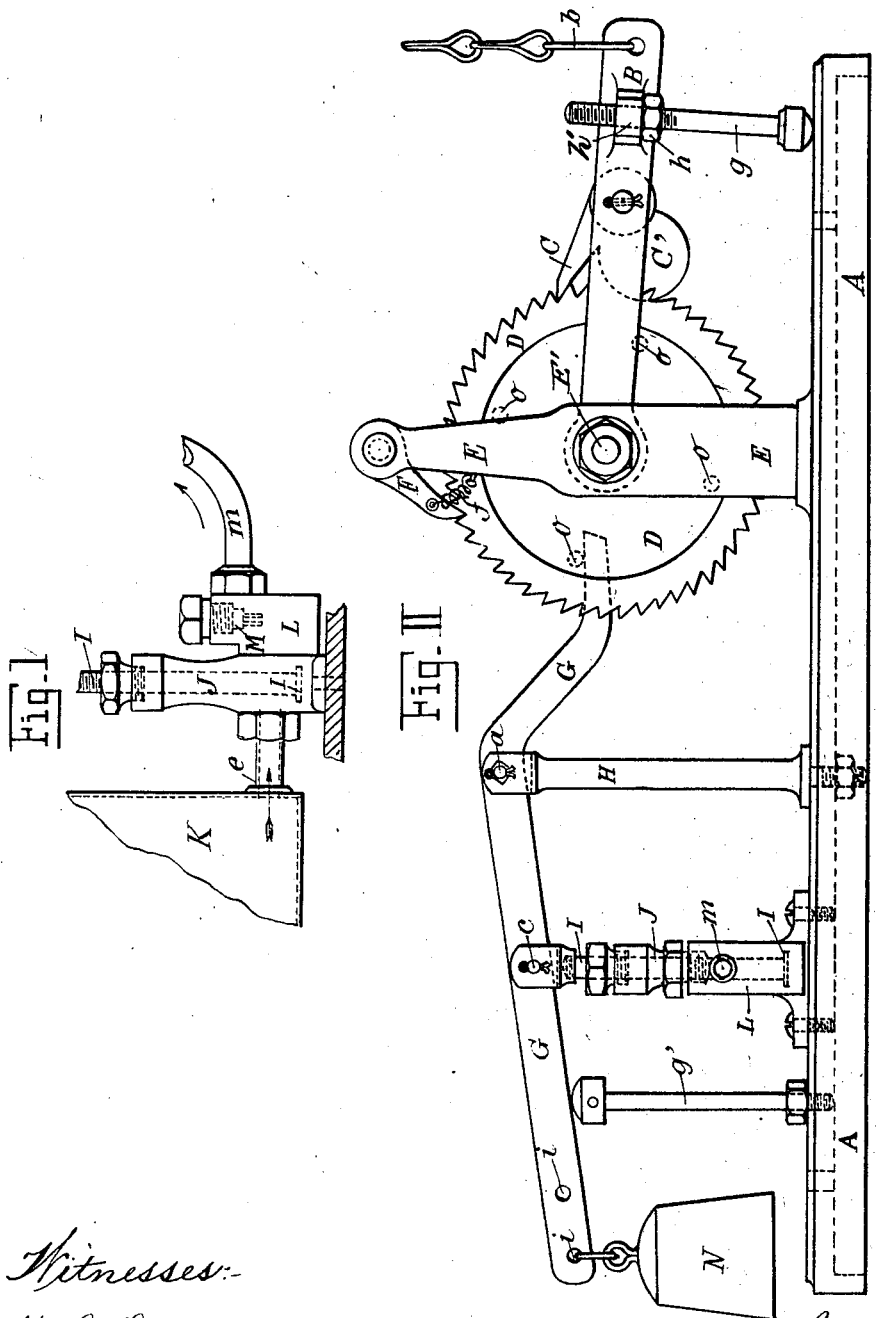
Witnesses:
H. B. Boulter
C. T. Northup
Inventors:
Napoleon Drucbert
Achille Drucbert
by their attorney Wm. E. Boulter

United States Patent Office.

NAPOLEON DRUCBERT AND ACHILLE DRUCBERT, OF FOURNNES, FRANCE.

LUBRICATOR.

SPECIFICATION forming part of Letters Patent No. 494,738, dated April 4, 1893.

Application filed December 27, 1892. Serial No. 456,506. (No model.)

*To all whom it may concern:*

Be it known that we, NAPOLEON DRUC-BERT and ACHILLE DRUCBERT, citizens of the French Republic, residing at Fournnes, in France, have invented certain new and useful Improvements in Lubricators, of which the following is a description.

Our invention has relation to automatic lubricators designed for use in connection with various classes of machinery and our invention has for its primary object to provide a lubricator which is of simple and inexpensive construction, and which is adapted to be operated by the machine to which it is applied to regularly and uniformly deliver the lubricant to the part or parts of said machine which it is desired to lubricate, and with the above object in view, the invention consists in the construction, arrangement and combination of parts, all as hereinafter fully described, illustrated in the accompanying drawings, and pointed out particularly in the claims.

In the drawings:—Figure 1 is a detail elevation of the cylinder and valve chamber and portions of the oil reservoir and delivery pipe. Fig. 2 is a side elevation of the complete apparatus.

Referring to the above described drawings, A indicates a suitable support or base for the machine, upon which base is secured a standard or upright E. Upon the short shaft E' having a bearing in said upright is loosely mounted one end of a lever B to whose opposite end is connected a chain $b$, which latter may be suitably connected with some moving part of the machine to be lubricated which will impart an up and down or oscillating movement to said lever B. Instead of a chain $b$, other means may be resorted to for connecting the lever with the operating element of the machine, to obtain the necessary oscillating movement of the said lever. Also mounted upon the shaft E' in rear of the lever B is a toothed or ratchet wheel D which upon its rear face is provided with a number of pins or tappets $o$, the number of which may be varied, said pins being arranged at equidistant points on said ratchet wheel, as shown. Pivoted to the lever B is a pawl C which engages the teeth of the wheel D, and said pawl is maintained in engagement with the teeth of said wheel by providing an enlarged portion C' on said pawl, the weight of which is sufficient to effect the desired object.

To the upper end of the upright E is pivoted a pawl F which is designed to prevent backward movement of the ratchet wheel D, said pawl being held in engagement with the teeth of the ratchet by means of a coiled spring $f$, as shown.

To the upper end of a standard or upright H secured to the base A is pivoted upon a pin $a$, a lever or beam G, the shorter arm of which lies in the path of and is adapted to be depressed by the pins or tappets $o$, as presently described, and to the longer arm of said lever is secured a weight N.

Secured to the base A is a housing or cylinder J in which is fitted and adapted to reciprocate a piston I, the upper end of which is pivotally secured as at $c$, to the lever G. Secured to the housing J and in communication with the interior thereof is a valve-box or casing L to which is connected a pipe $m$, which leads off and is adapted to deliver the lubricant to the part or parts of the machine which it is desired to lubricate. A valve M screwing into the casing L is adapted to regulate the quantity of lubricant discharged into the pipe $m$ from the casing L. Communicating with the cylinder J at the side thereof opposite to the casing L, is a pipe $e$, which also communicates with the oil-reservoir K.

For the purpose of regulating the extent of the oscillating movement of the lever B and thereby varying the distance which the ratchet wheel D turns at each upward movement of said lever B, we employ preferably, a rod $g$, which is screw-threaded at its upper end and adapted to screw in a threaded lug or ear $h'$ on the lever B, and be secured by a check nut $h$. The lower end of the rod is adapted to abut against the base A, as shown. By adjusting the rod within the lug $h'$ it will be readily seen that the extent of the oscillations of lever B can be varied whereby the distance which the ratchet wheel turns will also be varied.

For the purpose of varying the extent of the oscillating movements of the lever G, we employ a rod $g'$ the lower end of which is threaded and screws into the base A, and against the upper end of which rod is adapted to abut the lever G, as shown. By adjusting the rod within the base the extent of the oscillations of said lever can be varied, as will be readily seen, and for varying the degree of force with which the said lever descends under the influence of the weight N, we provide two (or more) holes $i$, in the lever with which the suspending device for the weight may be made to engage. By adjusting the weight N nearer to or farther from the fulcrum of the lever, the same will be made to descend with variable force.

The operation of the described apparatus may be briefly described as follows:—The lubricant having been placed in the reservoir, and the lever B connected in any suitable manner with the moving portion of the machine, and the pipe $m$, placed in the proper communication with the parts to be lubricated, the lever B will be oscillated, and the same will, in its upward movement cause the ratchet wheel D to rotate a distance dependent upon the extent of the oscillation of said lever which will be determined by the adjusting rod $g$, as before described. The partial rotation of the ratchet wheel causes the forward end of the lever G to be depressed by reason of said end of the lever lying beneath one of the pins $o$. At the same time the rear end of the lever G is raised and with it the piston I which thus permits lubricant to flow from the reservoir K into the casing J and valve-casing L. The depression of the forward end of the lever and the simultaneous raising of the rear end thereof continue until the pin $o$, clears the nose of said lever, whereupon the weight N acts to pull downwardly the rear end of the lever and raise the forward end thereof, causing the piston I to be depressed which forces the lubricant out of the valve-casing and through the pipe $m$, to the part to be lubricated. The upward movement of the forward end of the lever G continues until it strikes beneath another of the pins $o$, to be again depressed thereby upon the next upward movement of the lever B, the described operation of the several parts being repeated as long as the lever B is oscillated and effecting an intermittent feed of the lubricant. The degree of force with which the lubricant is fed through the pipe $m$, will depend upon the degree of adjustment of the weight toward or from the fulcrum of the lever G, while the quantity of lubricant fed at each oscillation of said lever will depend upon the adjustment of the rod $g'$ and that of the valve M, as will be understood. We might, in some instances, dispense with the lever B, for actuating the ratchet-wheel, and operate the latter by means of a crank or eccentric of the machine.

What I claim, and desire to secure by Letters Patent, is—

1. In a lubricator of the class described, the combination with a revoluble ratchet wheel, an oscillating lever adapted to impart an intermittent rotation to said ratchet-wheel, a series of pins or tenons on the face of said ratchet wheel, a second oscillating lever one end of which lies in the path of and adapted to be operated by the said pins, a weight on the opposite end of said lever, of a piston connected with and adapted to be reciprocated by said second oscillating lever a casing in which said piston is arranged, and a reservoir for the lubricant and a delivery pipe in communication with said casing, all arranged and cooperating, substantially as described.

2. In a lubricator of the class described, the combination with a revoluble ratchet-wheel, an oscillating lever adapted to impart an intermittent rotation to said ratchet-wheel, a series of pins or tenons on the face of said ratchet-wheel, a second oscillating lever one end of which lies in the path of and adapted to be operated by the said pins, a weight on the opposite end of said lever and means for varying the degree of oscillation of said levers, of a piston connected with and adapted to be reciprocated by said second oscillating lever, a casing in which said piston is arranged, and a reservoir for the lubricant and a delivery pipe in communication with said casing, all arranged and cooperating substantially as described.

3. In a lubricator of the class described, the combination with a suitable base or support a revoluble ratchet-wheel, an oscillating lever adapted to impart an intermittent rotation to said ratchet-wheel, a series of pins or tenons on the face of said ratchet-wheel, a second oscillating lever one end of which lies in the path of and adapted to be operated by the said pins, a weight on the opposite end of said lever, and means for varying the degree of oscillation of said levers consisting of a screw-rod carried by and adjustable upon one of said levers and adapted to abut against the support or base, and a screw-rod carried by and adjustable on said base, and against which the other lever is adapted to abut, of a piston connected with and adapted to be reciprocated by the latter lever, a casing in which said piston is arranged, and a lubricant reservoir and a delivery pipe in communication with said casing, all arranged as and for the purpose specified.

4. In a lubricator of the class described, the combination with a base or support, standards carried by said base, a ratchet-wheel mounted upon a shaft carried by one of said standards, an oscillating lever also mounted upon said shaft, a pawl pivoted to said lever and engaging the teeth of the ratchet-wheel, a second pawl carried by the standard and engaging said teeth, a second oscillating lever pivotally mounted upon the other standard, pins or tenons on the face of said ratchet-wheel, and adapted to operate the latter lever, and a weight upon the said lever, of a piston pivotally connected with said lever a casing in which said piston is arranged, a valve-casing into which the piston casing is adapted to discharge, a valve in said valve-casing, a reservoir for the lubricant, a pipe connecting the said reservoir and the piston casing, and a delivery pipe connected with the valve-casing, all arranged as and for the purpose specified.

5. In a lubricator of the class described, the combination with a revoluble ratchet-wheel, a series of pins or tenons on the face of said ratchet-wheel, a second oscillating lever one end of which lies in the path of and adapted to be operated by the said pins, and a weight on the opposite end of said lever, of a piston connected with and adapted to be reciprocated by said second lever, a casing in which said piston is arranged, and a reservoir for the lubricant and a delivery pipe in communication with said casing, all arranged as and for the purpose specified.

In testimony that we claim the foregoing we have hereunto set our hands this 13th day of October, 1892.

NAPOLEON DRUCBERT.
ACHILLE DRUCBERT.

Witnesses:
VICTOR MATRAY,
JOSEPH SALING.